(12) United States Patent
Fukao et al.

(10) Patent No.: US 10,099,747 B2
(45) Date of Patent: Oct. 16, 2018

(54) BICYCLE SHIFT OPERATING DEVICE

(75) Inventors: Kazutaka Fukao, Osaka (JP);
Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 795 days.

(21) Appl. No.: 13/159,451

(22) Filed: Jun. 14, 2011

(65) Prior Publication Data
US 2012/0318094 A1 Dec. 20, 2012

(51) Int. Cl.
*B62M 25/04* (2006.01)
*B62K 23/06* (2006.01)

(52) U.S. Cl.
CPC ............ *B62M 25/04* (2013.01); *B62K 23/06* (2013.01); *Y10T 74/20438* (2015.01)

(58) Field of Classification Search
CPC ........... B62M 25/04; B62K 23/06; B62L 3/02
USPC ....................... 74/488, 489, 502.2
See application file for complete search history.

(56) References Cited

U.S. PATENT DOCUMENTS

| | | | |
|---|---|---|---|
| 5,400,675 A * | 3/1995 | Nagano | 74/502.2 |
| 6,718,843 B2 | 4/2004 | Campagnolo | |
| 7,526,979 B2 | 5/2009 | Tsumiyama | |
| 7,527,137 B1 * | 5/2009 | Calendrille, Jr. | 192/217 |
| 7,665,384 B2 | 2/2010 | Sato et al. | |
| 7,918,145 B1 * | 4/2011 | Calendrille, Jr. | 74/502.2 |
| 2004/0144193 A1 * | 7/2004 | Sato et al. | 74/502.2 |
| 2004/0163486 A1 * | 8/2004 | Irie et al. | 74/502.2 |
| 2006/0189423 A1 | 8/2006 | Ichida et al. | |
| 2006/0272443 A1 * | 12/2006 | Tsumiyama | 74/502.2 |
| 2008/0087126 A1 | 4/2008 | Oda et al. | |
| 2008/0295636 A1 * | 12/2008 | Sato et al. | 74/479.01 |
| 2008/0314183 A1 * | 12/2008 | Miki | 74/473.13 |
| 2008/0314191 A1 * | 12/2008 | Miki et al. | 74/502.2 |
| 2009/0114051 A1 * | 5/2009 | Miki | 74/489 |
| 2009/0139361 A1 | 6/2009 | Watarai | |
| 2010/0083788 A1 * | 4/2010 | Jordan et al. | 74/502.2 |
| 2011/0079103 A1 * | 4/2011 | Kususe et al. | 74/502.2 |
| 2011/0132123 A1 * | 6/2011 | Tsai et al. | 74/473.14 |

FOREIGN PATENT DOCUMENTS

FR 2 861 686 A1 5/2005

OTHER PUBLICATIONS

European Search Report of corresponding EP Application No. 12 15 1489.7 dated Aug. 28, 2012.

* cited by examiner

*Primary Examiner* — Richard W Ridley
*Assistant Examiner* — Brian J McGovern
(74) *Attorney, Agent, or Firm* — Global IP Counselors, LLP

(57) ABSTRACT

A bicycle shift operating device is basically provided with a base member, a shift unit, an operating lever and a connecting member. The shift unit is disposed in the base member between first and second ends of the base member. The operating lever is pivotally mounted relative to the base member about first and second pivot axes. The connecting member operatively connects the shift unit to the first operating lever. The connecting member includes a lever contact portion that contacts the operating lever to transmit movement of the operating lever to the connecting member in response to pivotal movement of the operating lever about the second pivot axis. The connecting member is arranged such that the contact portion passes through a space provided between the first pivot axis and the first operating lever from the top surface side with respect to the first pivot axis.

15 Claims, 18 Drawing Sheets

BICYCLE SHIFT OPERATING DEVICE

BACKGROUND

Field of the Invention

This invention generally relates to a bicycle shift operating device. More specifically, the present invention relates to a bicycle shift operating device that includes a shift unit.

Background Information

Bicycle shift operating devices are used to shift gears of a multi-speed bicycle transmission. The multi-speed bicycle transmission typically includes a chain, one or more front sprockets or gears mounted to a front crankset and a plurality of rear sprockets or gears mounted to a rear hub of a rear wheel. The front and rear shift operating devices are designed to operate gear changing devices (e.g., a derailleur or an internal hub gear mechanism) to select a desired gear ratio. A pedaling force from the rider is transferred from the front sprockets to the rear sprockets via the chain for turning the rear wheel.

Most mechanical brake/shift operating devices use control cables that connects the brake/shift operating devices to the brake devices for braking and the gear changing devices for shifting. These control cables are typically Bowden type cables with an outer case and an inner wire. For shifting, a shift operating lever is usually used for operating the brake device. For example, the brake lever is also used as one of the shift operating lever for pulling the shift cable, while a separate lever is provided for releasing the shift cable. An operating force is typically applied by one of the rider's fingers to operate the shift operating levers, which in turn transmits the operating force to the shift cable via a shift operating unit. In the case of road shifters (e.g., brake/shift operating devices), the shift cable is typically routed along the handlebar. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

One aspect of the present disclosure is to provide a bicycle shift operating device that includes a shift unit connected to an operating lever such that the operating lever is disposed out of the way of a rider's hand gripping a base member of the shift operating device.

In view of the state of the known technology, a bicycle shift operating device is disclosed that basically comprises a base member, a shift unit, a first operating lever and a connecting member. The base member includes a first end with a bicycle mounting structure, a second end spaced from the first end and a top surface extending between the first end and the second end. The shift unit is disposed in the base member between the first and second ends. The first operating lever is pivotally mounted relative to the base member about a first pivot axis, and pivotally mounted relative to the base member about a second pivot axis. The connecting member operatively connects the shift unit to the first operating lever. The connecting member includes a lever contact portion that contacts the first operating lever to transmit movement of the first operating lever to the connecting member in response to pivotal movement of the first operating lever about the second pivot axis. The connecting member is arranged such that the contact portion passes through a space provided between the first pivot axis and the first operating lever from the top surface side with respect to the first pivot axis.

Various objects, features, aspects and advantages of the present disclosure will become apparent to those skilled in the art from the following detailed description, which, taken in conjunction with the annexed drawings, discloses one illustrative embodiment of a bicycle shift operating device.

BRIEF DESCRIPTION OF THE DRAWINGS

Referring now to the attached drawings which form a part of this original disclosure.

DETAILED DESCRIPTION OF EMBODIMENT

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
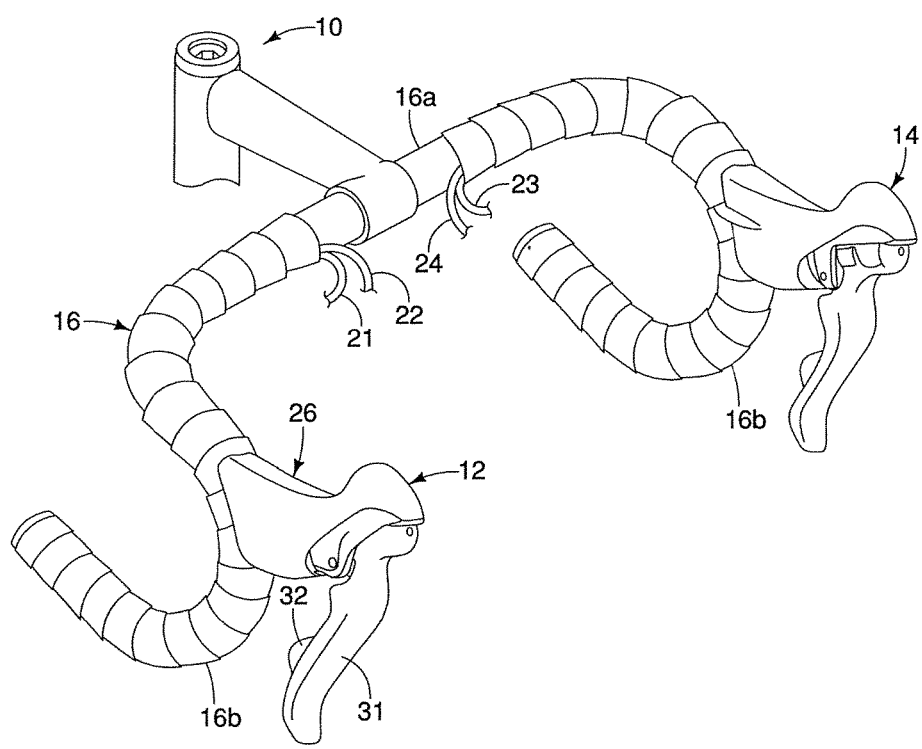
FIG. 1 is a front perspective view of a portion of a bicycle equipped with a pair of bicycle shift operating devices coupled to a drop type handlebar in their installed positions in accordance with a first embodiment.

Referring initially to FIG. 1, a portion of a bicycle 10 that is equipped with a pair of bicycle shift operating devices 12 and 14 is illustrated. The bicycle shift operating devices 12 and 14 are mounted on a drop down handlebar 16 in accordance with the illustrated embodiments as seen in FIG. 1. The bicycle shift operating device 12 is a right hand side control device operated by the rider's right hand to operate a first brake device (not shown) and a first gear shifting device (not shown, e.g., a cable operated rear derailleur). The bicycle shift operating device 14 is a left hand side control device operated by the rider's left hand to operate a second brake device (not shown) and a second gear shifting device (not shown, e.g., a cable operated front derailleur). The first and second gear shifting devices are part of a conventional bicycle driving system that is used to shift a bicycle chain for changing speeds of the drive train in a relatively conventional manner. In the illustrated embodiment, the bicycle shift operating device 12 is operatively coupled to the first gear shifting device via a shift control cable 21 and the first brake device via a brake control cable 22. The bicycle shift operating device 14 is operatively coupled to the second gear changing device via a shift control cable 23 and the second brake device via a brake control cable 24.

Figure 2:
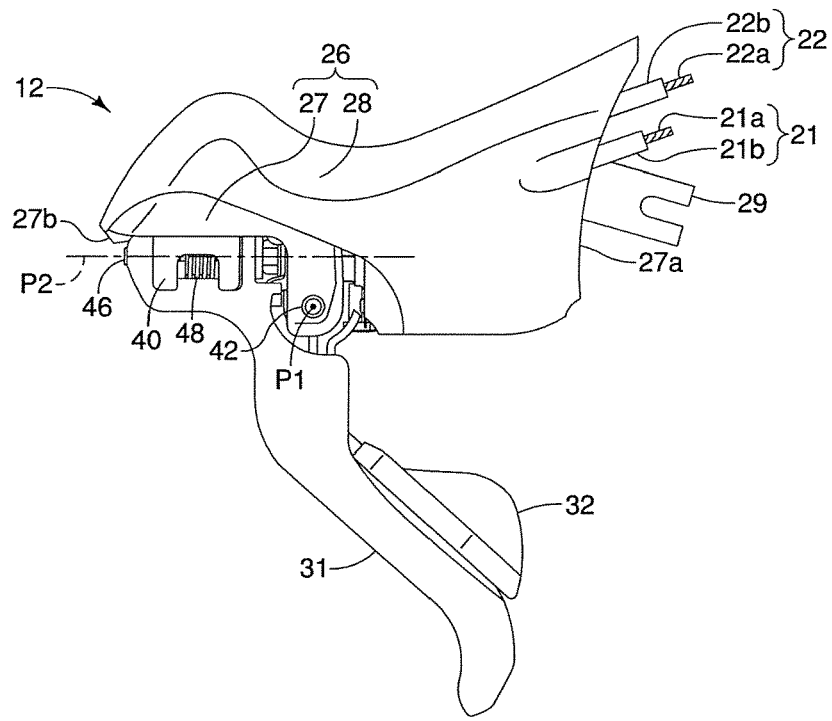
FIG. 2 is an inside elevational view of the right hand side shift operating devices illustrated in FIG. 1 with the brake/shift operating lever and the shift (release) lever in their rest positions.
Figure 3:
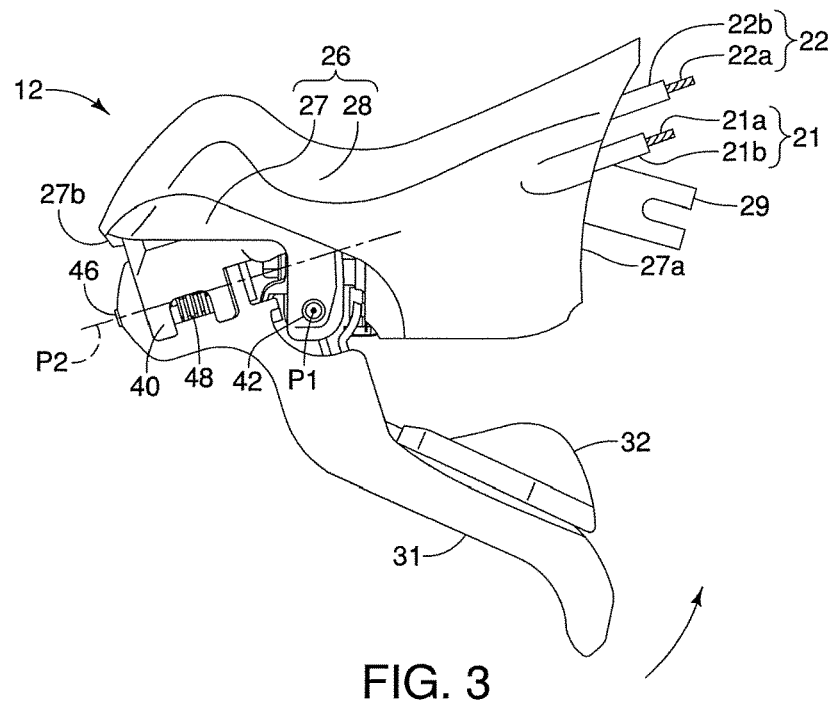
FIG. 3 is an inside elevational view of the right hand side shift operating device illustrated in FIG. 3 with the brake/shift operating lever pivoted to a braking position.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 2 and 3, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle shift operating device 12 to the first gear shifting device for shifting the first gear shifting device in response to operation of the bicycle shift operating device 12.

In the illustrated embodiment, the right and left hand side bicycle shift operating devices 12 and 14 are essentially identical in operation, except that they are mirror images of each other and they may have a different number of shift operations. In other words, the left hand side bicycle shift operating device 14 is substantially identical to the right hand side bicycle shift operating device 12, except for the shifting unit (not shown) of the left hand side bicycle shift operating device 14 has been modified to be a mirror image and to decrease the number of gears that can be shifted. Thus, only the right hand side bicycle shift operating device 12 will be discussed and illustrated herein.

As seen in FIG. 1, normally, the gripping portions of the drop down handlebar 16 and portions of the control cables 21 and 22 are covered by the bar tape. The drop down handlebar 16 typically includes a straight cross portion 16a and a pair of downwardly curved portions 16b. The straight cross portion 16a connects upper ends of the downwardly curved portions 16b. The shift operating devices 12 and 14 are mounted to the downwardly curved portions 16b of the drop down handlebar 16. In the illustrated embodiment, the bicycle shift operating device 12 is mounted on the right hand side of the drop down handlebar 16 and the bicycle shift operating device 14 is mounted on the left hand side of the drop down handlebar 16. However, each of the shift operating devices 12 and 14 can be manufactured as a mirror of the illustrated embodiment, such that the shift operating devices 12 and 14 can be mounted on opposite sides of the drop down handlebar 16.

Figure 4:
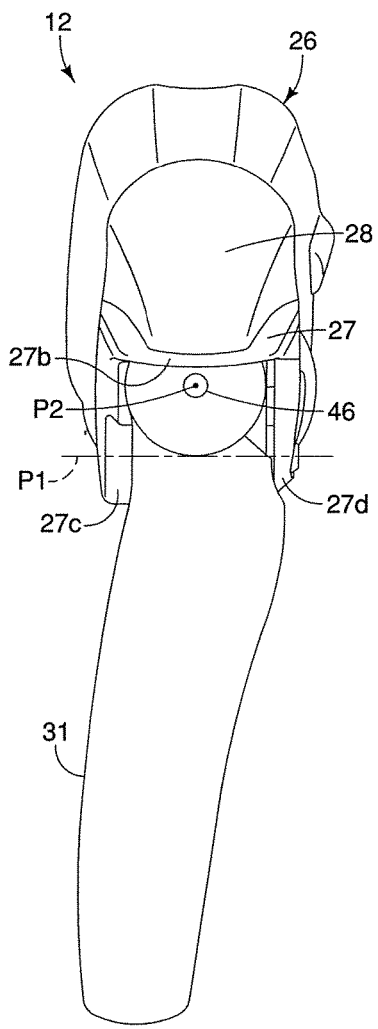
FIG. 4 is a front elevational view of the right hand side shift operating device illustrated in FIGS. 1 to 3 with the brake/shift operating lever and the shift (release) lever in their rest positions.
Figure 13:
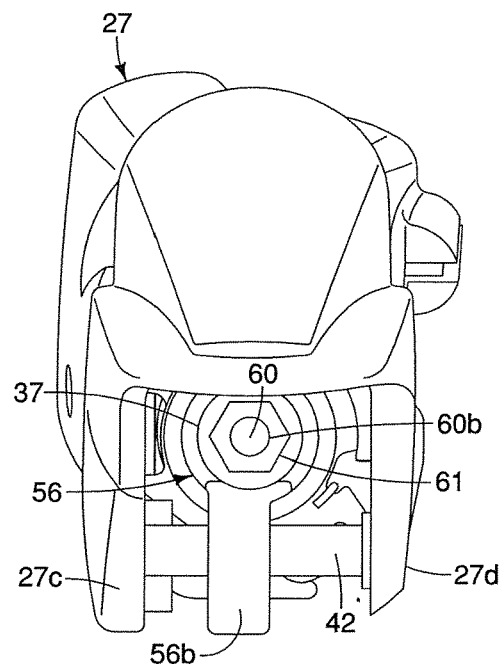
FIG. 13 is a front elevational view of the base member and the shift operating unit installed in the bracket.
Figure 14:
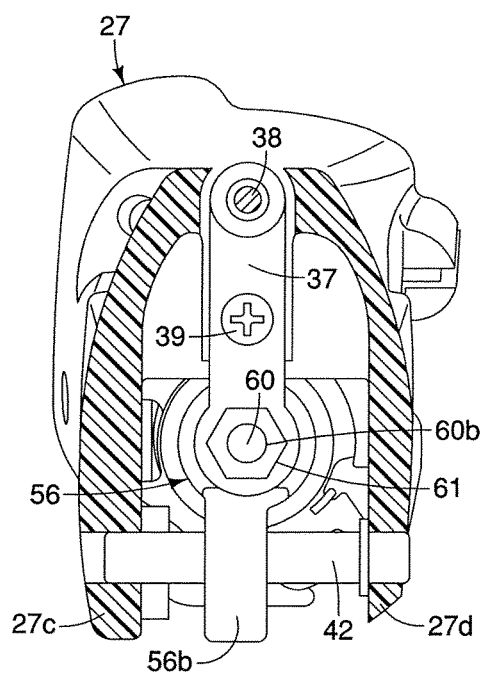
FIG. 14 is a transverse cross sectional view of the base member as seen along section line 14-14 of FIG. 11.

As seen in FIGS. 2 and 3, the bicycle shift operating device 12 includes a bracket 26. The bracket 26 has a base member 27 and a grip cover 28. Typically, the base member 27 is made of a rigid, hard plastic material. The base member 27 has a first or rear end 27a with a handlebar mounting structure 29 for fixedly mounting the base member 27 to one of the curved portions 16b of the drop down handlebar 16 (FIG. 1). The handlebar mounting structure 29 is preferably a conventional band clamp or similar structure that is used in a road shifter for mounting to a drop down style handlebar such as the drop down handlebar 16. Thus, the handlebar mounting structure 27 will not be discussed in detail herein. The base member 27 has a second or front end 27b that is spaced from the first end 27a. Further, the base member 27 has a pair of pivot attachment portions 27c and 27d. The pivot attachment portions 27c and 27d are disposed at the lateral surfaces of the base member 27, respectively as best seen in FIGS. 4, 13 and 14. Since the base member 27 is fixed to the drop down handlebar 16 by the handlebar mounting structure 29, the bracket 26 constitutes a fixed member. The grip cover 28 is made of elastic material such as rubber. The grip cover 28 is stretched over a gripping portion of the base member 27.

In this embodiment, as best seen in FIGS. 2 to 8, the bicycle shift operating device 12 further includes a shift operating unit 30, a brake/shift operating lever 31 (e.g., a first operating lever) and a shift operating lever 32 (e.g., a second operating lever). The base member 27 of the bracket 26 houses the shift operating unit 30 in an interior space or cavity 33 of the base member 27. The brake/shift operating lever 31 and the shift operating lever 32 are examples of user operated levers used for operating the shift operating unit 30 as discussed below. The brake/shift operating lever 31 and the shift operating lever 32 are both movable with respect to the base member 27 to operate the shift operating unit 30. In the illustrated embodiment, the brake/shift operating lever 31 and the shift operating lever 32 are trigger type levers that are biased to the rest positions in a conventional manner. The term "rest position" as used herein refers to a state in which the part (e.g., the brake/shift operating lever 31 and the shift operating lever 32) remains stationary without the need of a user holding the part in that state corresponding to the rest position.

Figure 5:
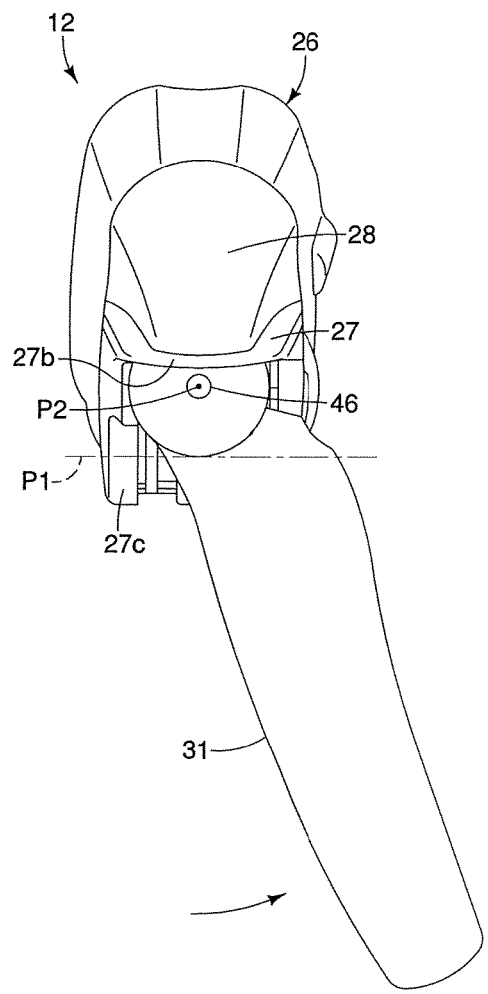
FIG. 5 is a front elevational view of the right hand side shift operating device illustrated in FIG. 4, but with the brake/shift operating lever of the right hand side shift operating device moved to a cable winding position.

As seen in FIGS. 2 to 5, the brake/shift operating lever 31 is used to perform both a braking operation and a shifting operation. FIGS. 2 and 4 illustrate the brake/shift operating lever 31 in the rest position. FIG. 3 illustrates the brake/shift operating lever 31 in a braking position, while FIG. 5 illustrates the brake/shift operating lever 31 in a shift operating position. The brake/shift operating lever 31 functions as a brake lever and a cable pulling lever. The brake/shift operating lever 31 is pivotally mounted relative to the base member 27 of the bracket 26 about a brake pivot axis P1 that extends transverse to the lateral surfaces of the base member 27. The brake/shift operating lever 31 is also pivotally mounted relative to the base member 27 of the base member 27 about a shift pivot axis P2 along a plane that is transverse to a braking plane of brake/shift operating lever 31.

As seen in FIGS. 2 and 3, the brake/shift operating lever 31 functions as a brake lever by the rider pivoting the brake/shift operating lever 31 about the brake pivot axis P1 relative to the base member 27 of the bracket 26 towards the curved portion 16b of the handlebar 16. This pivotal movement of the brake/shift operating lever 31 from the rest position to the braking position along a non-shift operating path pulls the inner wire 22a of the brake cable 22 to operate the first brake device. As seen in FIGS. 4 and 5, the brake/shift operating lever 31 functions as a cable pulling (winding) lever by the rider pivoting the brake/shift operating lever 31 about a shift pivot axis P2 relative to the base member 27 of the bracket 26 in a direction towards a bicycle longitudinal center plane. The brake/shift operating lever 31 pulls the inner wire 21a of the shift cable 21 into the shift operating unit 30 by pivoting the brake/shift operating lever 31 about the shift pivot axis P2 relative to the base member 27 of the bracket 26 towards a center longitudinal plane of the bicycle 10. Thus, the brake/shift operating lever 31 is operatively coupled to the shift operating unit 30 for performing cable pulling operations that operate the first gear shifting device.

Figure 6:
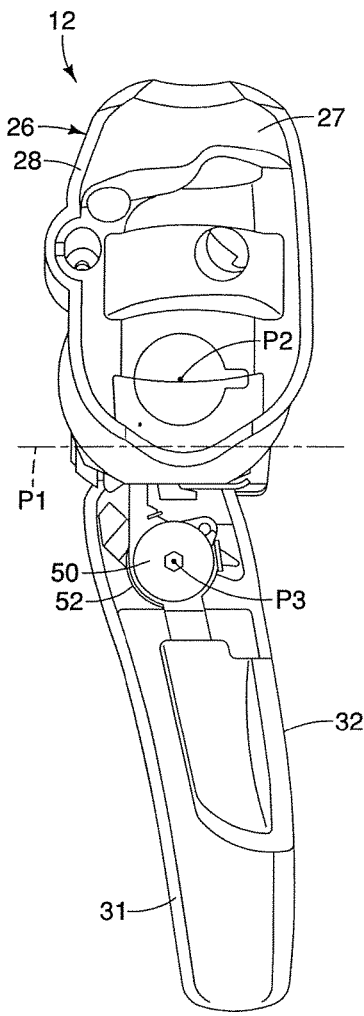
FIG. 6 is a rear elevational view of the right hand side shift operating device illustrated in FIGS. 4 and 5 with the brake/shift operating lever and the shift (release) lever in their rest positions.
Figure 7:
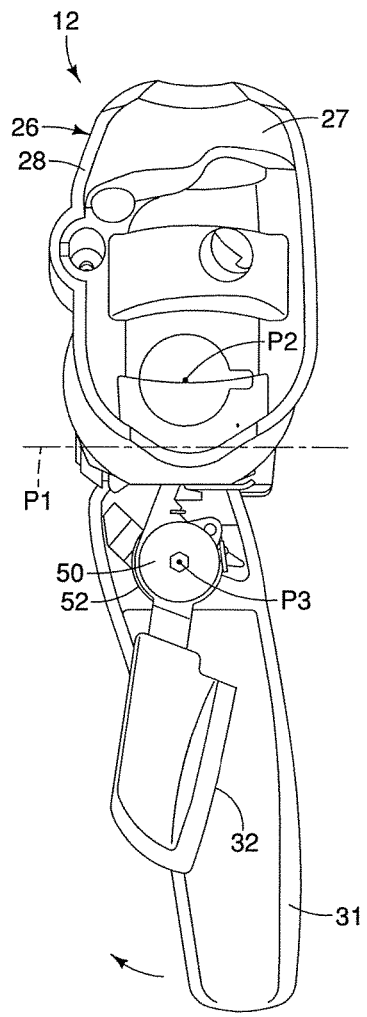
FIG. 7 is a rear elevational view of the right hand side shift operating device illustrated in FIG. 6, but with the shift (release) lever moved to a cable releasing position.

As seen in FIGS. 6 and 7, the shift operating lever 32 is pivotally mounted on the brake/shift operating lever 31 such that the shift operating lever 32 pivots relative to the brake/shift operating lever 31. The shift operating lever 32 only performs a shifting operation (i.e., a cable releasing operation). Thus, the shift operating lever 32 constitutes as a cable releasing lever. FIG. 6 illustrates the shift operating lever 32 in the rest position. FIG. 7 illustrates the shift operating lever 32 in a shift operating position. In particular, the shift operating lever 32 is pivotally mounted on the brake/shift operating lever 31 such that the shift operating lever 32 pivots relative to the brake/shift operating lever 31 about a shift pivot axis P3 between the rest position and the shifting position. The brake/shift operating lever 31 and the shift operating lever 32 are arranged such that the shift pivot axes P2 and P3 are offset. In the illustrated embodiment, the shift operating lever 32 releases the inner wire 21a from the shift operating unit 30 by pivoting the shift operating lever 32 about the shift pivot axis P3 towards the center longitudinal plane of the bicycle 10. This pivotal movement of the shift operating lever 32 operates the shift operating unit 30 for performing a cable releasing operation of the shift operating unit 30 to operate a gear shifting device (e.g., shifting a chain between the gears). In the illustrated embodiment, the shift operating lever 32 moves with the brake/shift operating lever 31 as the brake/shift operating lever 31 is moved to perform braking operations and shifting operations as shown in FIGS. 3 and 5. However, the brake/shift operating lever 31 generally remains stationary during movement of the shift operating lever 32 to perform shifting operations as seen in FIG. 7.

Figure 8:
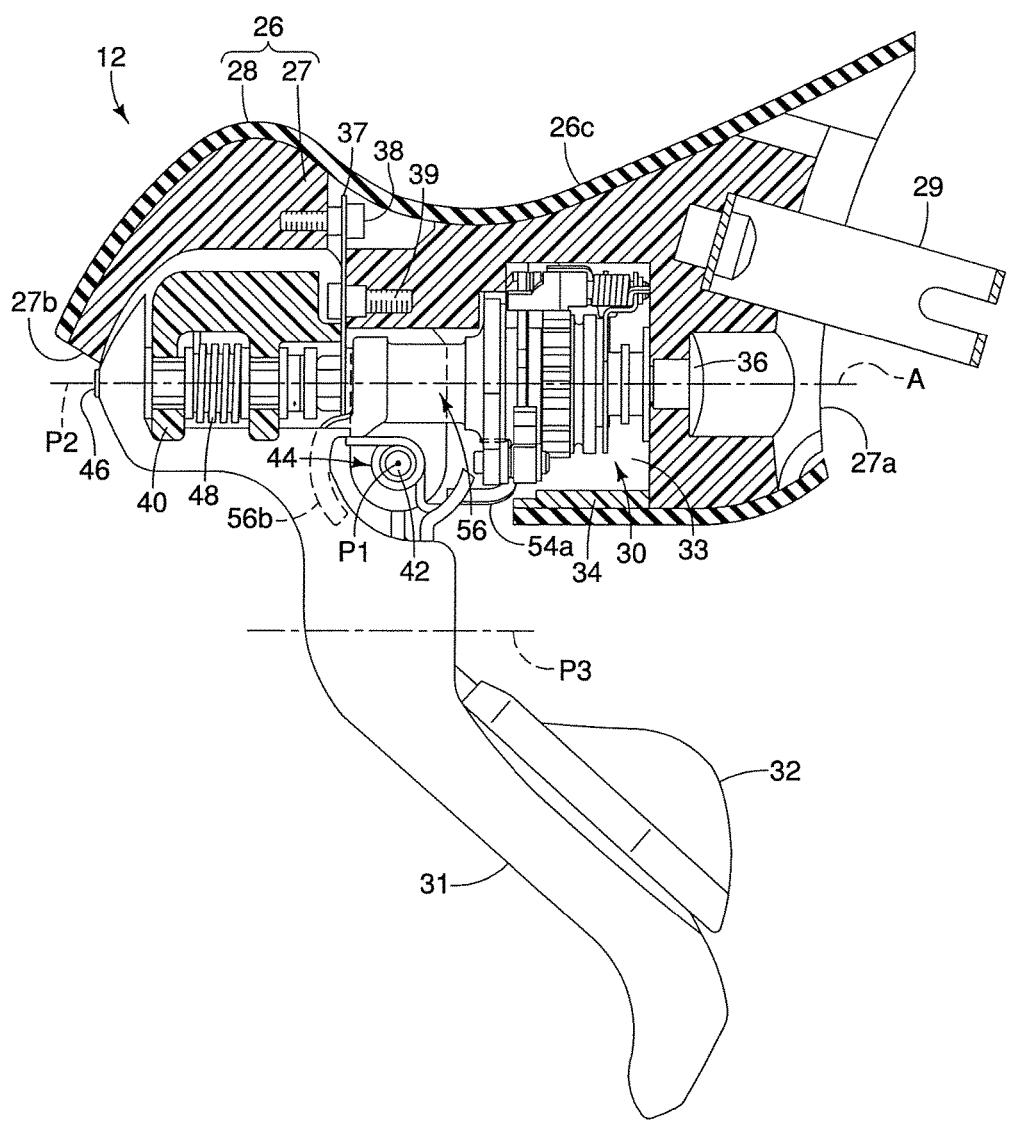
FIG. 8 is a longitudinal cross sectional view of the bracket of the right hand side shift operating device with the operating levers and the shift operating unit illustrated in elevation.

As seen in FIG. 8, the base member 27 of the bracket 26 is provided with an access cover 34. The access cover 34 is removably attached to the base member 27 and at least partially closing an insertion opening 35. The insertion opening 35 is provided on a bottom surface of the base member 27 for providing access into the interior space 33 of the base member 27 of the bracket 26. In the illustrated embodiment, the base member 27 is configured such that the insertion opening 35 continuously extends from the pivot axis P1 toward a front end or first end and a rear or second end with respect to the pivot axis P1. Thus, the insertion opening 35 extends the majority of the length of the bottom surface of the base member 27 of the bracket 26. In the illustrated embodiment, the access cover 34 is removably attached to the access cover 34 by a pair of fasteners (e.g., screws). Of course, the access cover 34 can be removably attached to the base member 27 in other ways such as a snap-fit arrangement.

As seen in FIG. 8, the rear end of the shift operating unit 30 is attached to the base member 27 by a fastening element 36 (e.g., bolt), while the front end of the shift operating unit 30 is attached to the base member 27 by a hanger 37 using a pair of fasteners 38 and 39 (e.g., screws). Thus, the shift operating unit 30 is disposed in the interior space 33 of the base member 27 between the rear end and the front end.

Figure 9:
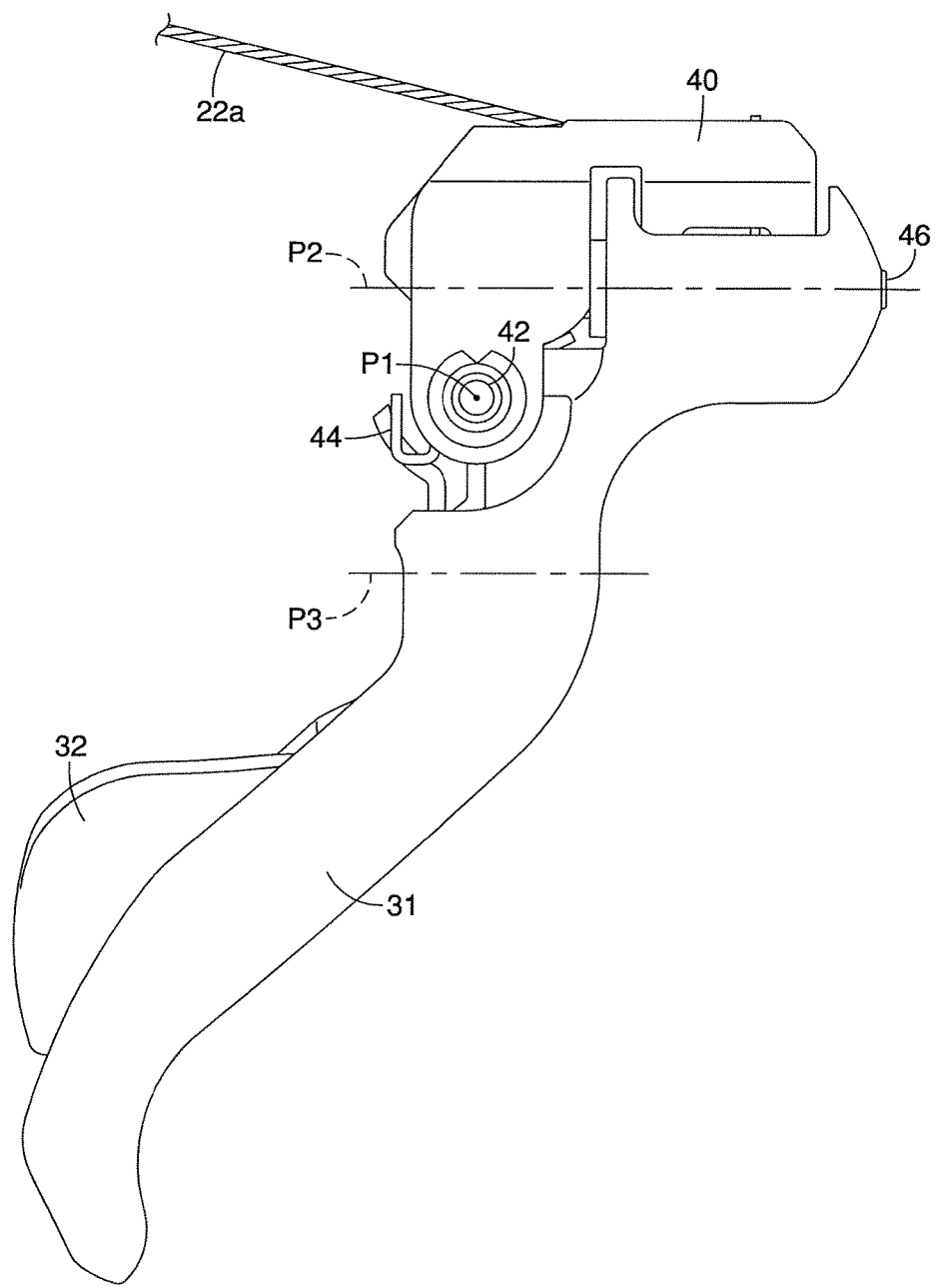
FIG. 9 is a side elevational view of the brake/shift operating lever and the shift (release) lever of the right hand side shift operating device.
Figure 10:
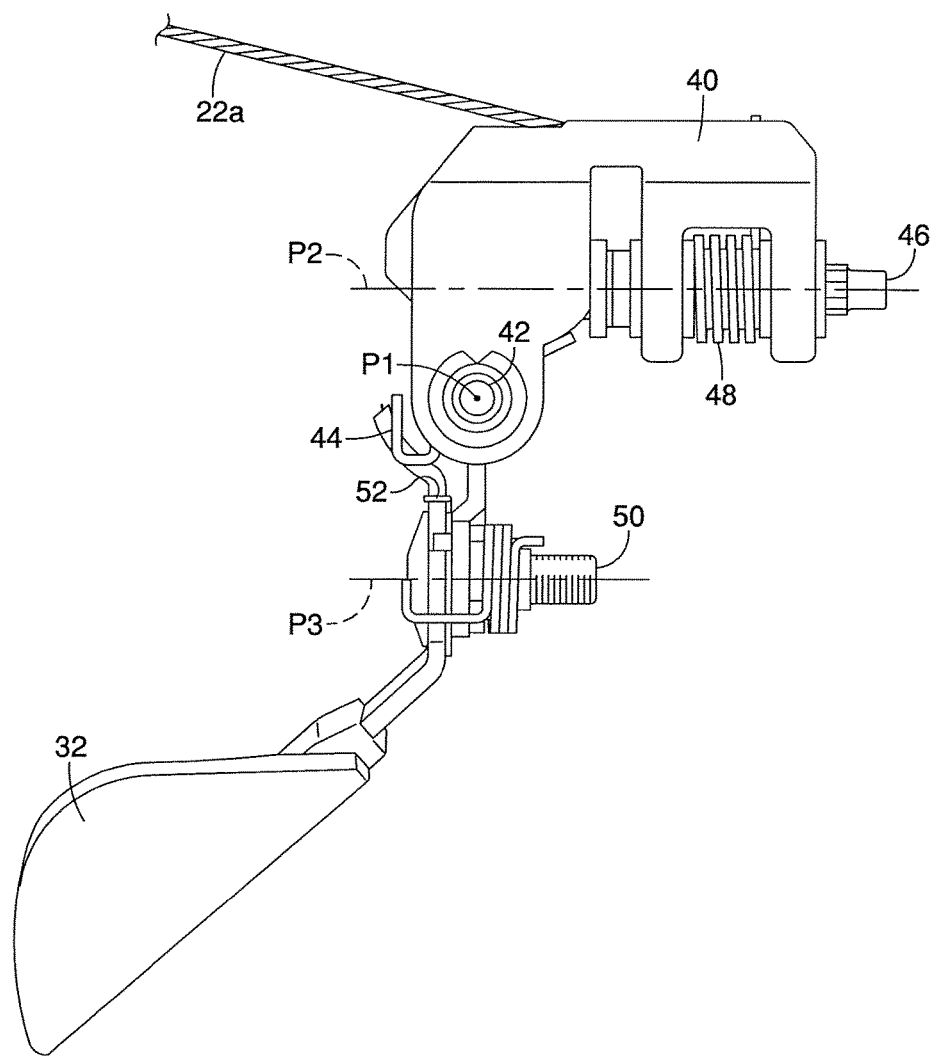
FIG. 10 is a side elevational view of the shift (release) lever of the right hand side shift operating device.
Figure 11:
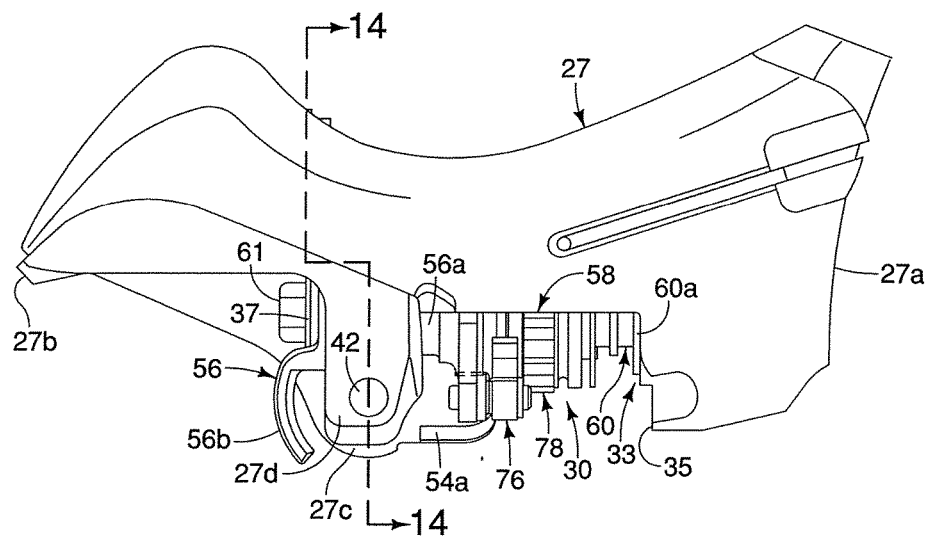
FIG. 11 is a side elevational view of the base member and the shift operating unit with the bottom access cover removed to show the shift operating unit installed in the base member.
Figure 12:
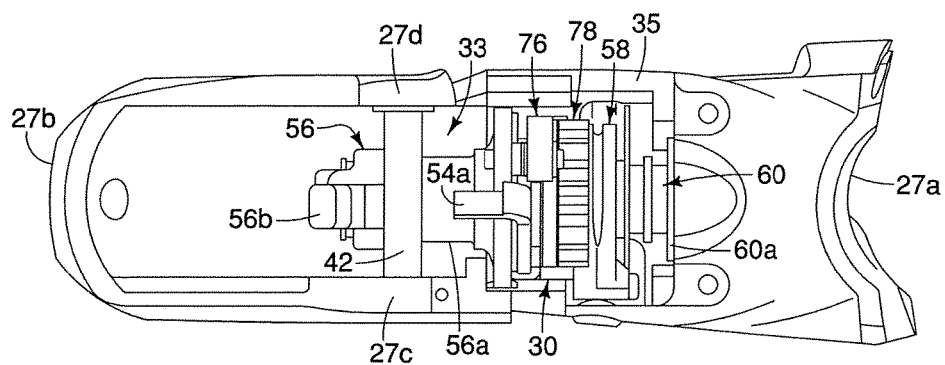
FIG. 12 is a bottom plan view of the base member and the shift operating unit with the bottom access cover removed to show the shift operating unit installed in the base member.

Referring to FIGS. 8 to 10, the brake/shift operating lever 31 is provided with a support member 40 for movably supporting the brake/shift operating lever 31 and the shift operating lever 32 on the base member 27 of the bracket 26. The support member 40 is pivotally attached to the base member 27 by a pivot pin 42 that defines the brake pivot axis P1. The pivot pin 42 is located in holes of the pivot attachment portions 27c and 27d of the bracket 27. A biasing element 44 is provided between the base member 27 and the support member 40. The biasing element 44 is arranged for biasing the support member 40 and the brake/shift operating lever 31 to the rest position as seen in FIG. 2. In the illustrated embodiment, the biasing element 44 is a torsion spring with its coiled portion disposed on the pivot pin 42 and its first and second free ends contacting the base member 27 and the support member 40, respectively.

As best seen in FIG. 8, the brake/shift operating lever 31 is pivotally attached to the support member 40 by a pivot pin 46 that defines the shift pivot axis P2. A biasing element 48 is provided between the brake/shift operating lever 31 and the support member 40. The biasing element 48 is arranged for biasing the brake/shift operating lever 31 to the rest position. In the illustrated embodiment, the biasing element 48 is a torsion spring with its coiled portion disposed on the pivot pin 46 and its first and second free ends contacting the brake/shift operating lever 31 and the support member 40, respectively.

As best seen in FIG. 9, the support member 40 constitutes a brake cable attachment structure of the brake/shift operating lever 31 for attaching the inner wire 22a. When the brake/shift operating lever 31 is pivoted about the brake pivot axis P1, the brake/shift operating lever 31 pulls the inner wire 22a relative to the outer case 22b to perform a braking operation. Generally speaking, in performing braking operations, the brake/shift operating lever 31 moves in a longitudinal direction with respect to the bracket 26. In other words, during a braking operation, the brake/shift operating lever 31 moves along a brake operating plane that is substantially perpendicular the shift operating planes of the brake/shift operating lever 31 and the shift operating lever 32. Thus, the brake/shift operating lever 31 moves with respect to the bracket 26 about the brake pivot axis P1 that is perpendicular to the shift pivot axes P2 and P3.

Referring to FIGS. 6 and 7, the shift operating lever 32 is also pivotally mounted to the brake/shift operating lever 31 by a bolt 50 that defines the shift pivot axis P3. The shift pivot axis P3 can be either parallel to the shift pivot axis P2, as illustrated, or angled with respect to the shift pivot axis P2 as viewed in a direction parallel to the brake pivot axis P1. A biasing element 52 is provided between the brake/shift operating lever 31 and the shift operating lever 32 for biasing the shift operating lever 32 to a rest position. In the illustrated embodiment, the biasing element 52 is a torsion spring with its coiled portion disposed on the pivot pin 50 and its first and second free ends contacting the brake/shift operating lever 31 and the shift operating lever 32, respectively.

Turning now to FIGS. 15 to 30, the shift operating unit 30 will now be discussed. The shift operating unit 30 basically includes a release member 54, a connecting member 56 and a cable take-up member or spool 58. The release member 54 and the connecting member 56 constitute actuating members of the shift operating unit 30. The release member 54 operatively connects the shift operating unit 30 to the shift operating lever 32. The connecting member 56 operatively connects the shift operating unit 30 to the brake/shift operating lever 31. In the illustrated embodiment, the connecting member 56 is pivoted in the first rotational direction R1 with respect to a main pivot axis A of the shift operating unit 30 by the brake/shift operating lever 31 to selectively operate the take-up member 58 in a first rotational direction R1 (i.e., a cable pulling direction). In the illustrated embodiment, the release member 54 is pivoted in a second rotational direction R2 with respect to a main pivot axis A of the shift operating unit 30 by the shift operating lever 32 to selectively operate the take-up member 58 in the second rotational direction R2 (i.e., a cable releasing direction).

Figure 15:
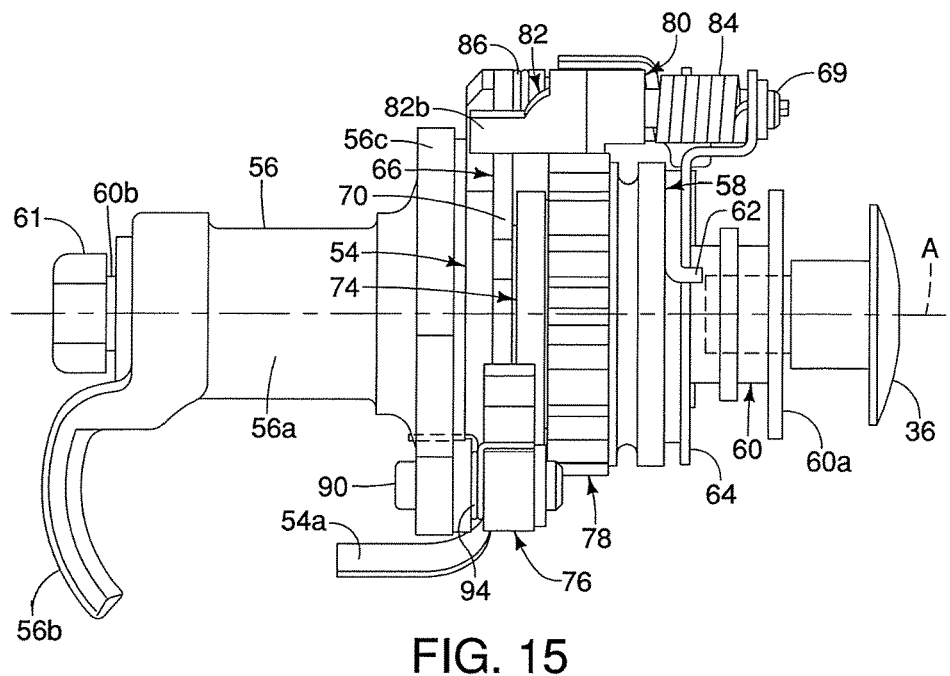
FIG. 15 is a side elevational view of the shift operating unit with the parts in their rest positions.
Figure 18:
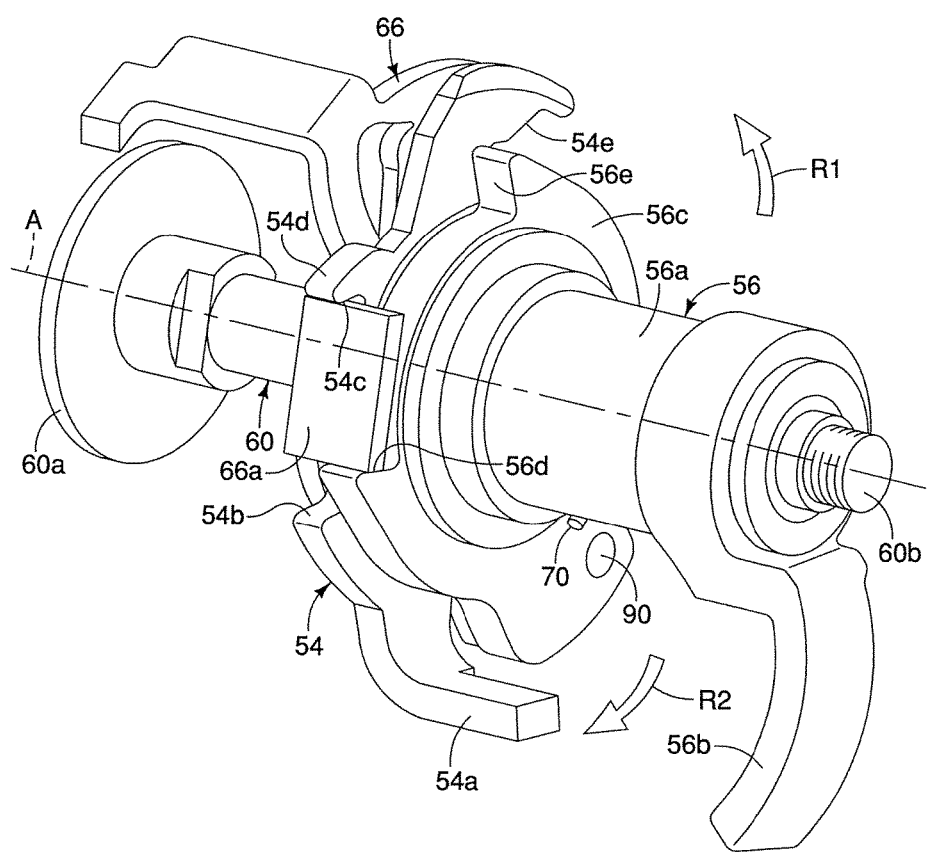
FIG. 18 is a front perspective view of selected parts of the shift operating unit in their rest positions.
Figure 19:
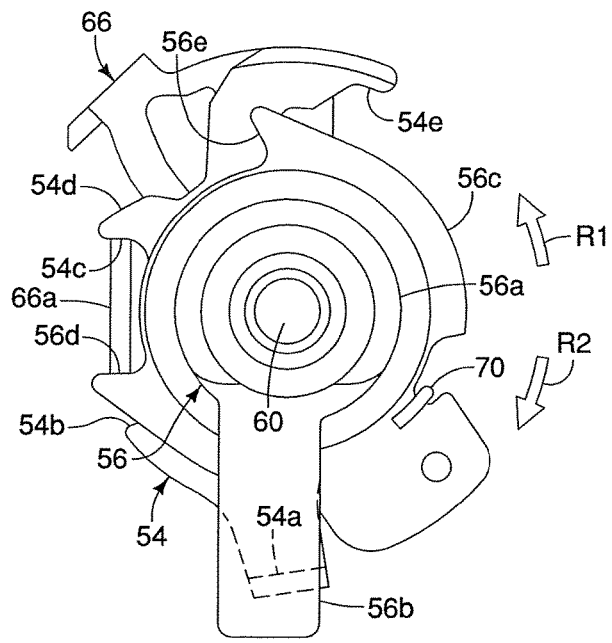
FIG. 19 is a front elevational view of the selected parts of the shift operating unit shown in FIG. 18 in their rest positions.
Figure 20:
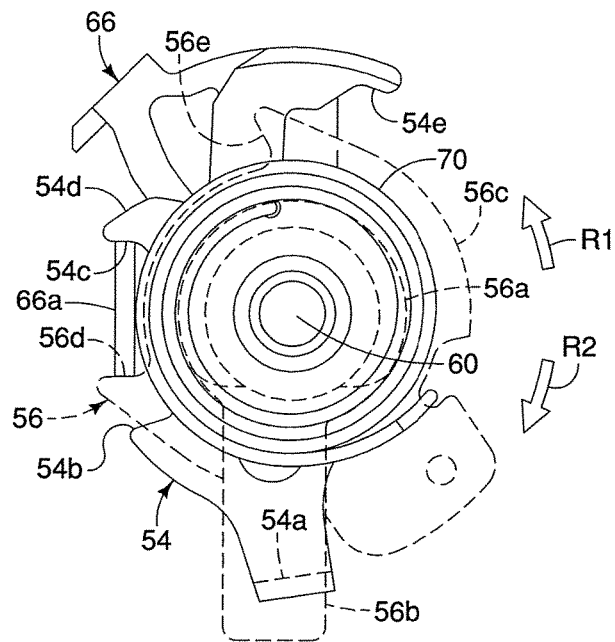
FIG. 20 is a front elevational view of the selected parts of the shift operating unit shown in FIGS. 18 and 19 in their rest positions, but with the connecting member shown in dashed lines to show the biasing element between the connecting member and the release member.
Figure 21:
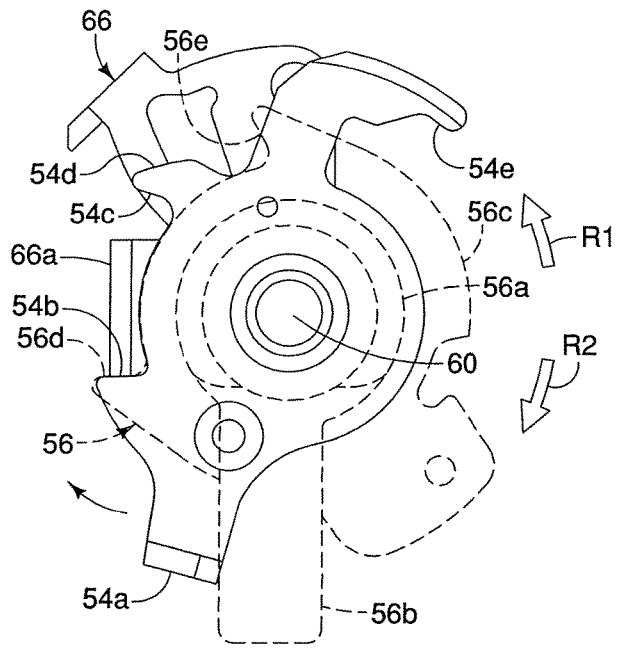
FIG. 21 is a front elevational view of the selected parts of the shift operating unit shown in FIGS. 18 to 20, but with the connecting member shown in dashed lines and the release member moved to a cable releasing position.
Figure 22:
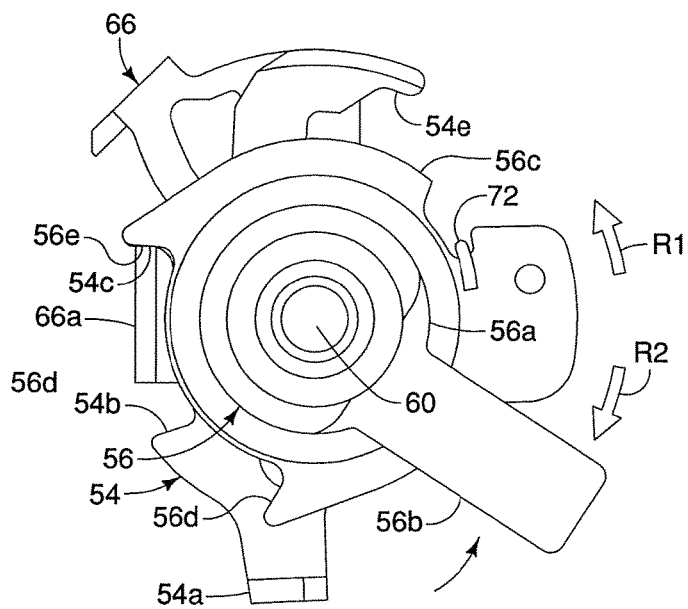
FIG. 22 is a front elevational view of the selected parts of the shift operating unit shown in FIGS. 18 to 21, but with the connecting member shown in solid lines and the connecting member moved to a cable pulling position.

As seen in FIGS. 15 and 18, the shift axle 60 defines the overall length of the shift operating unit 30. Thus, the dimension of the insertion opening 35 is preferably as large as or larger than the axial length the shift axle 60. In this way, the shift operating unit 30 is easy inserted into the interior space 33 of the base member 27 of the bracket 26 through the insertion opening 35. In particular, the insertion opening 35 further has a dimension in a longitudinal direction of the base member 27 that at least equal to an axial length of a shift axle 60 of the shift operating unit 30 such that the shift operating unit 30 is insertable into the interior space 33 of the base member 27 through the insertion opening 35 in a direction perpendicular to the shift axle 60 in an installed position. The shift axle 60 has a first axle end 60a that is supported to the base member 27 by the fastening element 36 and a second axle end 60b supported by the hanger 37 that is attached to the base member 27 of the bracket 26 as discussed above.

Figure 17:
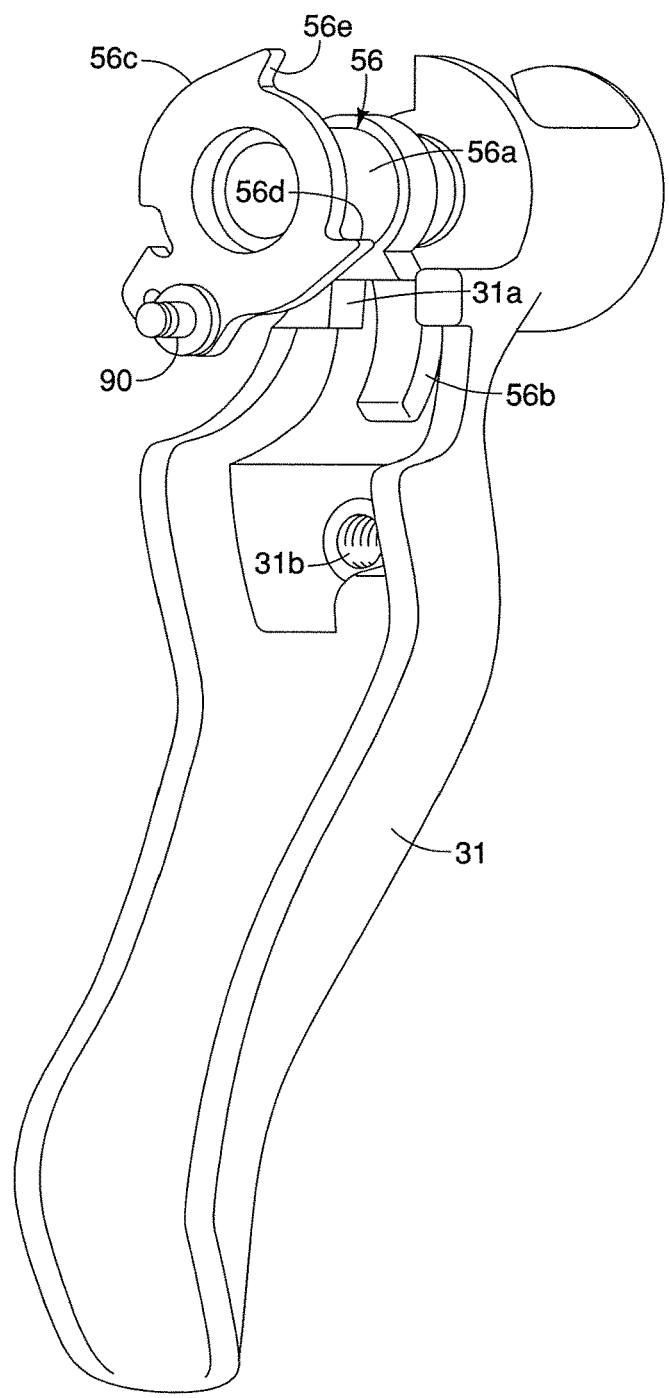
FIG. 17 is a rear perspective view of the brake/shift operating lever and the shift (release) lever of the right hand side shift operating device.

As seen in FIG. 17, the rearward facing surface of the brake/shift operating lever 31 has a recess 31a for receiving the connecting member 56 and a threaded hole for receiving the bolt 50 for pivotally attaching the shift operating lever 32. More specifically, the connecting member 56 is received between the rearward facing surface of the brake/shift operating lever 31 and the brake pivot axis P1 as explained below. With this arrangement, the release member 54 can be operated by the rider using the shift operating lever 32 while the brake/shift operating lever 31 is pivoted to a braking position (FIG. 3). Likewise, with this arrangement, the connecting member 56 can be operated by the rider using the brake/shift operating lever 31 while the brake/shift operating lever 31 is pivoted to a braking position (FIG. 3).

Figure 16:
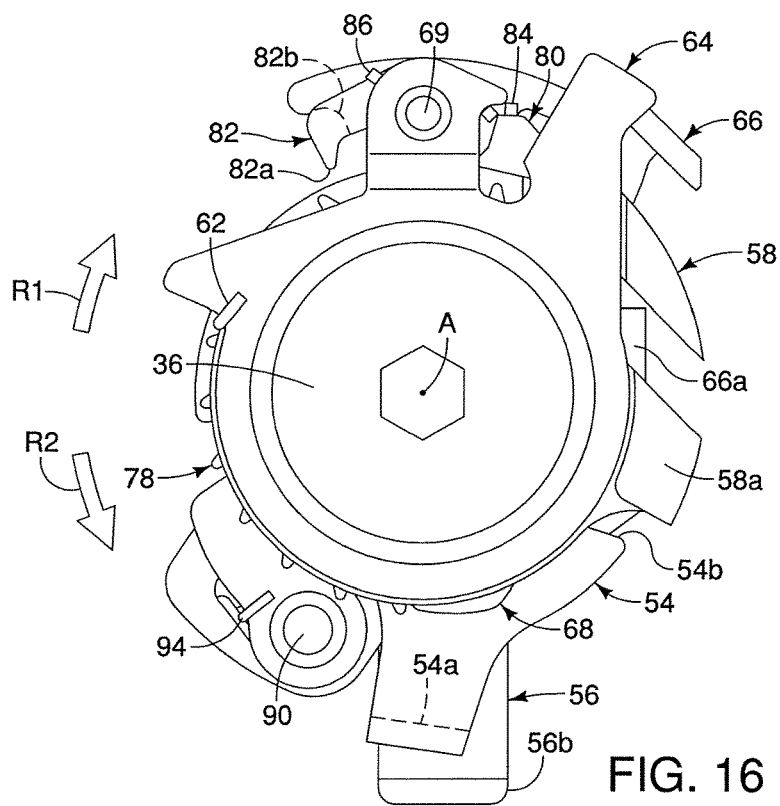
FIG. 16 is a rear elevational view of the shift operating unit shown in FIG. 15 with the parts in their rest positions.

As seen in FIGS. 15 and 16, the take-up member 58, the release member 54 and the connecting member 56 are coaxially arranged on the shift axle 60 of the shift operating unit 30. The shift axle 60 defines the main pivot axis A of the shift operating unit 30. The shift axle 60 pivotally supports the release member 54, the connecting member 56 and the take-up member 58 to the bracket 26 for rotation on the main pivot axis A (FIGS. 15 and 16). As seen in FIG. 8, in the illustrated embodiment, the main pivot axis A is aligned with the shift axis P2 and parallel to the shift axis P3 when the brake/shift operating lever 31 is in the rest position. On the other hand, the shift axis P2 is transversely arranged with respect to the brake pivot axis P1.

Basically, the take-up member 58 pivots in opposite rotational directions about the main pivot axis A in response to operation of the release member 54 and the connecting member 56 as discussed below. The take-up member 58 constitutes a wire winding body or moving member. The take-up member 58 pivots on the shift axle 60. The brake/shift operating lever 31 is operatively coupled to the shift operating unit 30 such that the take-up member 58 moves (rotates) in the first rotational direction R1 in response to pivotal movement of the connecting member 56 by the brake/shift operating lever 31. The shift operating lever 32 is operatively coupled to the shift operating unit 30 such that the take-up member 58 moves (rotates) in the second rotational direction R2 in response to pivotal movement of the release member 54 by the shift operating lever 32. The first rotational direction R1 is a cable winding direction that is opposite of the second rotational direction R2 (i.e., a cable releasing direction) with respect to the main pivot axis A of the shift operating unit 30. In the illustrated embodiment, the take-up member 58 is biased in the second rotational direction R2 (FIG. 16) by a biasing element 62. As seen in FIG. 16, the take-up member 58 has an attachment structure 58*a* for attaching the inner wire 21*a* of the cable 21 thereto.

Operation of the release member 54 causes the take-up member 58 to rotate in the second rotational direction R2 for releasing the inner wire 21*a*. In other words, rotation of the take-up member 58 in the second rotational direction R2 results in the inner wire 21*a* of the cable 21 being unwound from the peripheral edge of the take-up member 58. The release member 54 is operated by the rider pivoting the shift operating lever 32 about the shift pivot axis P3. In particular, the release member 54 has a contact member or flange 54*a* that is contacted by the shift operating lever 32 such that the release member 54 is pivoted in response to pivotally movement of the shift operating lever 32. As a result, the shift operating lever 32 is operatively coupled to the shift operating unit 30 to perform a cable releasing operation of the take-up member 58.

On the other hand, operation of the connecting member 56 causes the take-up member 58 to rotate in the first rotational direction R1 for pulling the inner wire 21*a*. The connecting member 56 is operated by the rider pivoting the brake/shift operating lever 31 about the shift pivot axis P2. In particular, the connecting member 56 includes a mounting portion 56*a* that is pivotally mounted on the shift axle 60 to pivot relative to the bracket 26. In the illustrated embodiment, as seen in FIG. 8, the support member 40 at least partially straddles the mounting portion 56*a* of the connecting member 56. The connecting member 56 extends forward between the pivot attachment portions 27*c* and 27*d* as seen in FIG. 8. The tubular mounting portion 56*a* is disposed at the top surface side with respect to the brake pivot axis P1.

The connecting member 56 also includes a lever contact portion 56*b* that extends in a radially outward direction from the mounting portion 56*a*. The connecting member 56 is arranged such that the lever contact portion 56*b* pass into a space provided between the brake pivot axis P1 and the brake/shift operating lever 31 from the top surface side with respect to the brake pivot axis P1. Specifically, the space is provided between the brake lever pivot axis P1 and the rearward facing surface of the brake/shift operating lever 31, with the lever contact portion 56*b* passing into that space. The lever contact portion 56*b* contacts the brake/shift operating lever 31 to transmit movement of the brake/shift operating lever 31 to the connecting member 56 in response to pivotal movement of the brake/shift operating lever 31 about the shift pivot axis P2. In particular, as seen in FIG. 17, the lever contact portion 56*b* is disposed in the recess 31*a* of the brake/shift operating lever 31 for transmitting movement of the brake/shift operating lever 31 to the connecting member 56. The lever contact portion 56*b* of the connecting member 56 is curved so as to always remain in contact with the brake/shift operating lever 31 while the brake/shift operating lever 31 is pivoted about the brake pivot axis P1 from its rest position to its braking (operated) position. In addition, in this particular embodiment, the orientation between the mounting portion 56*a* and the leaver contact portion 56*b* remains the same while the brake/shift operating lever 31 is pivoted about the first pivot axis P1 because the mounting portion 56*a* and the lever contact portion 56*b* are fixed together as seen in FIG. 18. Since the lever contact portion 56*b* of the connecting member 56 contacts the brake/shift operating lever 31, the connecting member 56 is pivoted in response to pivotally movement of the brake/shift operating lever 31. In this way, the connecting member 56 connects the brake/shift operating lever 31 to the shift operating unit 30. As a result, the brake/shift operating lever 31 is operatively coupled to the shift operating unit 30 to perform a cable pulling or winding operation of the take-up member 58. In other words, rotation of the brake/shift operating lever 31 causes the connecting member 56 to rotate the take-up member 58 in the first rotational direction R1. As a result, the inner wire 21*a* of the cable 21 is wound on the peripheral edge of the take-up member 58.

As seen in FIGS. 15 and 16, the shift operating unit 30 further includes a rear stationary plate 64 and a front stationary plate 66. The stationary plates 64 and 66 are rigid members that are all mounted on the shift axle 60. The stationary plates 64 and 66 are non-movable with respect to the base member 27 of the bracket 26. The rear stationary plate 64 is fixed to the front stationary plate 66 by a pivot pin 69. Thus, the stationary plates 64 and 66 are fixed together and contact the base member 27 of the bracket 26 such that the stationary plates 64 and 66 are held stationary by the base member 27.

As seen in FIGS. 15 and 16, the rear stationary plate 64 provides an attachment point for the biasing element 62 of the take-up member 58. In particular, the biasing element 62 is a torsion spring that has a first end hooked on the rear stationary plate 64 and a second end coupled to the take-up member 58. The biasing element 62 biases the take-up member 58 in the second rotational direction R2 (the cable releasing direction).

As seen in FIGS. 18 to 22, the front stationary plate 66 has a tab 66*a* that acts as a stationary stop member for the release member 54 and the connecting member 56. The tab 66*a* forms a pair of abutment that limits movement of the connecting member 56 in the first and second rotational directions R1 and R2 about the main pivot axis A of the shift operating unit 30. Thus, the tab 66*a* limits rotation of the connecting member 56 in the second rotational direction R2 to establish the rest position of the connecting member 56. In particular, the connecting member 56 has an annular plate 56*c* with a pair of abutments 56*d* and 56*e* for selectively contacting the tab 66*a* to limit rotation of the connecting member 56 in the first and second rotational directions R1 and R2. The abutment 56*d* of the connecting member 56 limits rotation of the connecting member 56 in the second rotational direction R2 to establish the rest position of the connecting member 56. The abutments of the tab 66*a* also limit movement of the release member 54 in the first and second rotational directions R1 and R2 about the main pivot axis A of the shift operating unit 30. In particular, the release member 54 has a pair of abutments 54*b* and 54*c* that selectively contacts the tab 66*a* to limit rotation of the release member 54 in the first and second rotational directions R1 and R2. The abutment 54*c* of the release member 54 limits rotation of the release member 54 in the first rotational direction R1 to establish the rest position of the release member 54.

In the illustrated embodiment, as seen in FIGS. 18 to 22, the release member 54 and the connecting member 56 are biased against the first abutment of the tab 66*a* by a biasing element 70. The biasing element 70 is provided between the release member 54 and the connecting member 56. The biasing element 70 is arranged for biasing the connecting member 56 such that the abutment 56d abuts against the second abutment of the tab 66a to their rest positions. In the illustrated embodiment, the biasing element 70 is a torsion spring with its coiled portion disposed on the shift axle 60 and its first and second free ends contacting the release member 54 and the connecting member 56, respectively. Thus, the release member 54 and the connecting member 56 are biased in opposite rotational directions by the biasing element 70 to their respective rest positions. In this way, the release member 54 and the connecting member 56 return to their respective rest positions after being released.

Moreover, due to the spring connection between the release member 54 and the connecting member 56, rotation of the release member 54 increases the biasing force applied to the connecting member 56 by the biasing element 70. In other words, the biasing element 70 biases the brake/shift operating lever 31 towards the rest position via the connecting member 56 while the shift operating lever 32 moves from its rest position to its shifting position. As a result, when the release member 54 is pivoted by the shift operating lever 32 being operated to perform a shifting (cable releasing) operation, the brake/shift operating lever 31 will not move with the shift operating lever 32 about the shift pivot axis P2. Rather during performing a shifting operation with the shift operating lever 32, the brake/shift operating lever 31 remains in its rest position with respect to the shift pivot axis P2 due to the combined biasing force of the biasing elements 48 and 70. In other words, the force on the brake/shift operating lever 31 in a direction about the shift pivot axis P2 becomes greater when the shift operating lever 32 is operated. In this way, the biasing element 70 biases the brake/shift operating lever 31 towards its rest position in response to independent movement of the shift operating lever 32 from its rest position to its shifting position while the brake/shift operating lever 31 remains at its rest position.

Referring to FIGS. 23 to 30, the shift operating unit 30 further includes a disengagement member 72, a pulling ratchet or plate 74, a pulling pawl 76, a positioning ratchet or plate 78, a positioning pawl 80 and a stopping pawl 82. The positioning ratchet 78, the positioning pawl 80 and the stopping pawl 82 of the shift operating unit 30 constitutes a shift positioning mechanism that selectively maintains the take-up member 58 in any one of a plurality of different shift positions. The pulling ratchet 74 and the positioning ratchet 78 are fixed to the take-up member 58 so that they rotate together as a unit. The positioning pawl 80 and the stopping pawl 82 are pivotally mounted on the pivot pin 69 to selectively engage the positioning ratchet 78 for controlling rotation of the take-up member 58. The pulling pawl 76 is pivotally mounted on the connecting member 56. The pulling pawl 76 is arranged to selectively rotate the pulling ratchet 74 of the shift operating unit 30. The pulling pawl 76 is disposed between the pivot axis P1 and the bicycle mounting structure 27 with respect to the longitudinal direction of the bracket 26.

The disengagement member 72 is pivotally mounted on the release member 54. The disengagement member 72 engages a slot 66b of the front stationary plate 66 to controls the movement of the disengagement member 72 between a retracted position (FIG. 26) and an extended position (FIG. 27). The disengagement member 72 is located in the retracted position when the release member 54 is in its rest position. However, when the release member 54 is moved to the shifted position, the disengagement member 72 moves to the extended position. In the extended position, the disengagement member 72 disengages the pulling pawl 76 from the pulling ratchet 74 so that the take-up member 58, the pulling ratchet 74 and the positioning ratchet 78 are free to rotate one shift position in the second rotational direction R2 once the positioning pawl 80 is disengaged from the positioning ratchet 78.

The pulling ratchet 74 will now be discussed in more detail. As best seen in FIGS. 15 and 23 to 28, the pulling ratchet 74 is a rigid ring shaped member that is fixedly coupled to the take-up member 58 to pivot with the take-up member 58 on the shift axle 60. In particular, the pulling ratchet 74 has a noncircular opening that mates with a corresponding noncircular hub of the take-up member 58. While the take-up member 58 and the pulling ratchet 74 are shown as separate members, it will be apparent from this disclosure that the take-up member 58 and the pulling ratchet 74 can be a one-piece, unitary member as needed and/or desired. In any event, the take-up member 58 and the pulling ratchet 74 are pivotally mounted as a unit on the shift axle 60. The pulling ratchet 74 has a peripheral edge that is provided with a plurality of pull teeth 74a. The pulling pawl 76 selectively engages the pull teeth 74a to move the pulling ratchet 74 response to the movement of the connecting member 56. In particular, the pulling pawl 76 selectively engages one of the pull teeth 74a to rotate the pulling ratchet 74 in the first rotational direction R1, which results in the take-up member 58 also rotating in the first rotational direction R1.

The positioning ratchet 78 will now be discussed in more detail. As best seen in FIGS. 15 and 23 to 28, the positioning ratchet 78 is a rigid ring shaped member that is fixedly coupled to the take-up member 58 to pivot with the take-up member 58 on the shift axle 60. In other words, the positioning ratchet 78 constitutes a positioning member that rotates with the take-up member 58. While the take-up member 58 and the positioning ratchet 78 are shown as separate members, it will be apparent from this disclosure that the take-up member 58 and the positioning ratchet 78 can be a one-piece, unitary member as needed and/or desired. In the illustrated embodiment, the positioning ratchet 78 has a noncircular opening that mates with a corresponding noncircular hub of the take-up member 58 so that the positioning ratchet 78 rotates with the take-up member 58. The positioning ratchet 78 includes a plurality of positioning teeth 78a that forms an abutment or stop for selectively being engaged with a positioning tooth 80a of the positioning pawl 80 and a stopping tooth 82a of the stopping pawl 82.

Basically, the positioning pawl 80 moves between a holding position (FIG. 26) and a non-holding position (FIG. 27). In the holding position, the positioning pawl 80 holds the take-up member 58 from moving in the second rotational direction R2 by selectively engaging the positioning ratchet 78. In the non-holding position, the positioning pawl 80 is disengaged from the positioning ratchet 78 by the release member 54. The stopping pawl 82 selectively moves between a non-stop or unrestricting position and a stop position. In the non-stop (rest) position, the stopping pawl 82 is located out of the path of one of the positioning ratchet 78. In the stop position, the stopping pawl 82 is located along the path of the positioning ratchet 78 by the release member 54 to catch and hold the take-up member 58 from moving in the second rotational direction R2. The stopping tooth 82a of the stopping pawl 82 moves closer to the rotational axis of the shift axle 60 as the stopping pawl 82 rotates from the unrestricting position to the stop position. The releasing member 54 is movably arranged between a non-releasing position and a releasing position such that the release member 54 rotates the positioning pawl 80 and the stopping pawl 82.

The pulling ratchet 74 and the positioning ratchet 78 are coaxially arranged with the take-up member 58 on the shift axle 60. The pulling ratchet 74 and the positioning ratchet 78 are arranged to rotate with the take-up member 58 on the shift axle 60. As explained below, the pulling pawl 76 selectively engages the pulling ratchet 74 to rotate the take-up member 58 on the shift axle 60 in the first rotational direction R1 in response to operation of the connecting member 56. The positioning pawl 80 and the stopping pawl 82 selectively engage the positioning ratchet 78 to hold the take-up member 58 from rotating on the shift axle 60 in the second rotational direction R2.

The release member 54 will now be discussed in more detail. As best seen in FIGS. 23 to 30 the release member 54 is a rigid ring shaped member that is pivotally supported on the shift axle 60. The release member 54 is not limited to a plate like member as illustrated. The release member 54 can have a different configuration as needed and/or desired. In the illustrated embodiment, the release member 54 is configured and arranged to rotate relative to the take-up member 58 on the shift axle 60. The release member 54 is movably supported on the shift axle 60 to operatively release the take-up member 58 by selectively pivoting the positioning pawl 80 and the stopping pawl 82 into and out of engagement with the positioning ratchet teeth 78a of the positioning ratchet 78. In particular, the release member 54 has a pair of cam surfaces 54d and 54e for selectively moving the positioning pawl 80 and the stopping pawl 82 into and out of engagement with the positioning ratchet teeth 78a of the positioning ratchet 78 as the release member 54 rotates on the shift axle 60 in the second rotational direction R2 in response to operation of the shift operating lever 32. In the illustrated embodiment, the positioning pawl 80 has a camming abutment 80b that extends in an axial direction of the shift operating unit 30 for engaging the release member 54 during a cable releasing operation. The stopping pawl 82 also has a camming abutment 82b that extends in an axial direction of the shift operating unit 30 for engaging the release member 54 during a cable releasing operation. Rotation of the release member 54 results in the cam surface 54d contacting the camming abutment 80b and moving the positioning pawl 80 out of engagement with the positioning ratchet teeth 78a of the positioning ratchet 78. Rotation of the release member 54 also results in the cam surface 54e contacting the camming abutment 82b and moving the stopping pawl 82 into engagement with the positioning ratchet teeth 78a of the positioning ratchet 78. In this way, the take-up member 58 rotates for only one shift position on the shift axle 60 in the second rotational direction R2.

Figure 23:
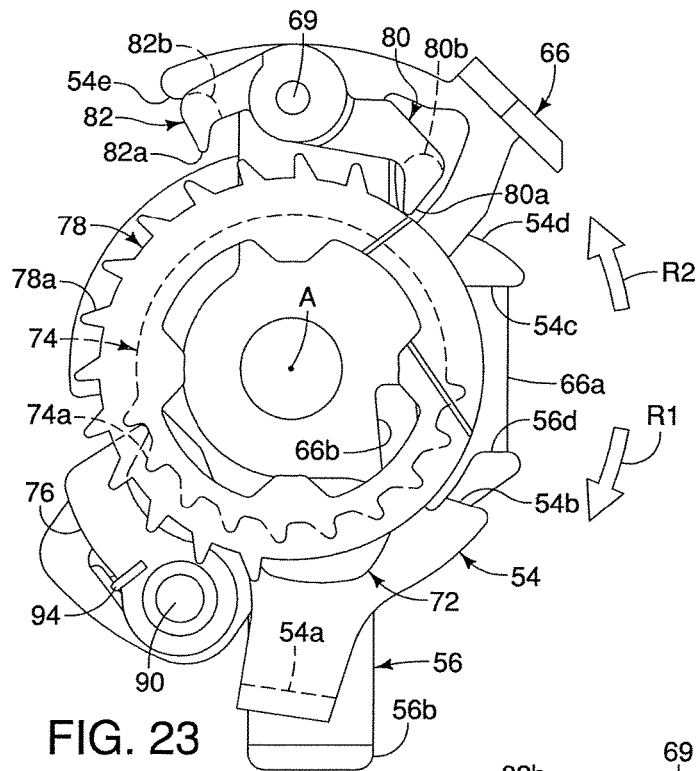
FIG. 23 is a rear elevational view of the selected parts of the shift operating unit shown in FIG. 22 with the parts in their rest positions.

In illustrated embodiment, the pulling pawl 76 is pivotally mounted on the connecting member 56 by a pivot pin 90. A biasing element 94 is provided between the connecting member 56 and the pulling pawl 76 for biasing the pulling pawl 76 into engagement with the pulling ratchet 74. In other words, with the shift operating unit 30 in the rest position, as seen in FIG. 23, the pulling pawl 76 is biased into contact with the pulling ratchet 74. In the illustrated embodiment, the biasing element 94 is a torsion spring. The biasing element 94 has its coiled portion disposed on the pivot pin 90 and its first and second free ends contacting the connecting member 56 and the pawl pulling pawl 76, respectively. As mentioned above, the pulling pawl 76 is disengaged from the pulling ratchet 74 by the disengagement member 72 as the release member 54 is rotated from its rest position to its shifting (cable releasing) position so that the take-up member 58, the pulling ratchet 74 and the positioning ratchet 78 are free to rotate one shift position in the second rotational direction R2 once the positioning pawl 80 is disengaged from the positioning ratchet 78.

The positioning pawl 80 and the stopping pawl 82 are pivotally mounted on the pivot pin 69 to selectively control the movement of the positioning ratchet 78 such that the take-up member 58 is selectively maintained in the desired shift positions. As mentioned above, the pivot pin 69 is mounted to the stationary plates 64 and 66. A first biasing element 84 is mounted on the pivot pin 69 for biasing the positioning pawl 80 into engagement with the positioning ratchet 78. In other words, the positioning pawl 80 is biased towards engagement with the positioning ratchet 78 such that a positioning tooth 80a of the positioning pawl 80 contacts the positioning ratchet 78 while the release member 54 is in the non-releasing position. A second biasing element 86 is mounted on the pivot pin 69 for biasing the stopping pawl 82 out of engagement with the positioning ratchet 78. The stopping pawl 82 is biased out of engagement with the positioning ratchet 78 such that a stopping tooth 82a of stopping pawl 82 separates from the positioning ratchet 78 while the release member 54 is in the non-releasing position. Thus, the positioning pawl 80 and the stopping pawl 82 move independently with respect to each other. Also the pivot pin 69 defines a secondary pivot axis that is offset from the main pivot axis A.

Figure 24:
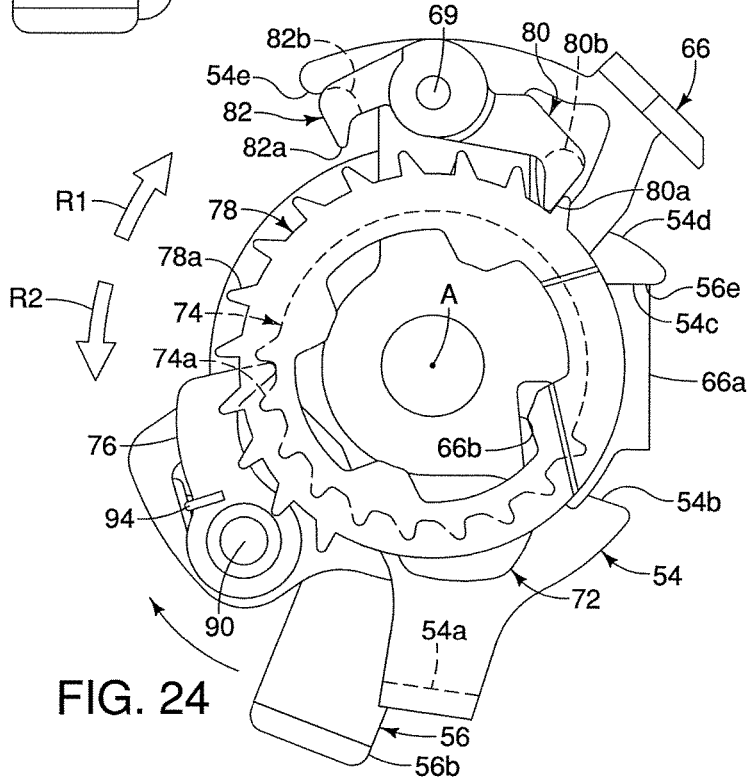
FIG. 24 is a rear elevational view of the selected parts of the shift operating unit shown in FIG. 23 with the connecting member moved to a cable pulling position from the rest position shown in FIG. 23 such that the pulling pawl engages the pulling ratchet to pull the inner wire connected to the rear derailleur.
Figure 25:
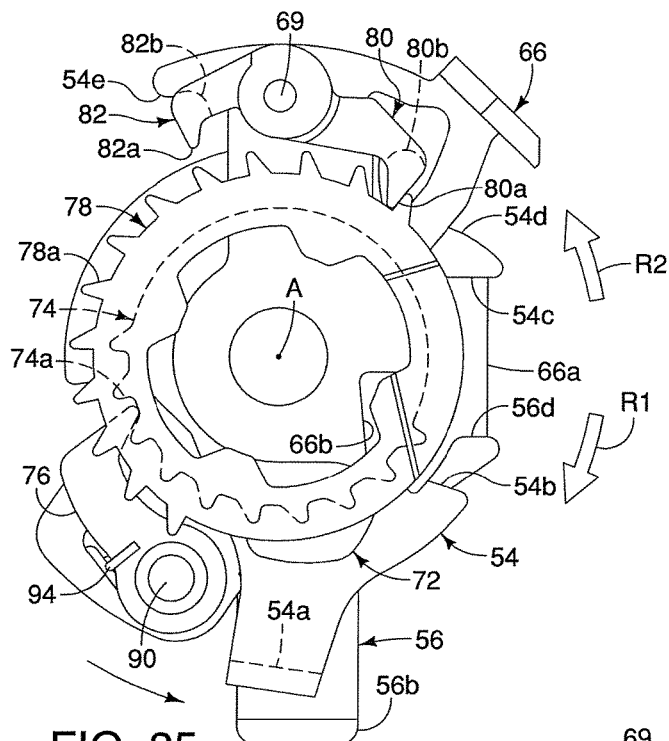
FIG. 25 is a rear elevational view of the selected parts of the shift operating unit shown in FIGS. 23 and 24 with the parts in their rest positions after the cable pulling operation of FIG. 24.

A cable pulling or winding operation of the shift operating unit 30 will now be discussed with reference primarily to FIGS. 23 to 25. Cable pulling operations of the shift operating unit 30 are performed by the rider pivotally moving the brake/shift operating lever 31 about the shift pivot axis P2 in the lateral inward direction towards the bicycle longitudinal center plane. The brake/shift operating lever 31 is operated in a single progressive movement such that in the connecting member 56 moves in a single progressive movement in the first rotational direction R1 from one of the shift or guiding positions to the next adjacent shift or guiding position. As mentioned above, a cable pulling or winding operation of the shift operating unit 30 is performed by the rider pivotally moving the brake/shift operating lever 31. This pivotal movement of the brake/shift operating lever 31 is transmitted to the connecting member 56 such that the connecting member 56 is rotated in the first rotational direction R1 from its rest position (FIG. 23) to its shifting position (FIG. 24). As the connecting member 56 rotates in the first rotational direction R1, the pulling pawl 76 pulls one of the pull teeth 74a of the pulling ratchet 74. This engagement of the pulling pawl 76 with one of the pull teeth 74a causes the pulling ratchet 74 to rotate in the first rotational direction R1. Rotation of the pulling ratchet 74 also results in the take-up member 58 and the positioning ratchet 78 to rotate together. Thus, the rotation of the positioning ratchet 78 results in the positioning pawl 80 moving out of engagement with one of the positioning teeth 78a and then engaging another one of the positioning teeth 78a to hold the take-up member 58 in the next desired shift position. When the brake/shift operating lever 31 is released such that the connecting member 56 is also released from its shifting position of FIG. 24, the connecting member 56 return to its rest position as seen in FIG. 25 and the positioning ratchet 78 is engaged with the positioning pawl 80 to maintain the take-up member 58 in the new shift position. Now, another winding operation of the shift operating unit 30 can be performed by the rider pivotally moving the brake/shift operating lever 31 about the shift pivot axis P2 in the lateral inward direction towards the bicycle longitudinal center plane. A single shift can be perform a single progressive movement of the brake/shift operating lever 31 by moving the brake/shift operating lever 31 a first amount and then releasing the brake/shift operating lever 31 as seen in FIGS. 23 to 25. Alternatively, by moving the brake/shift operating lever 31 a second amount that is greater than the first amount and then releasing the brake/shift operating lever 31, a multiple shift can be perform with a single progressive movement of the brake/shift operating lever 31.

A cable releasing operation of the shift operating unit 30 will now be discussed with reference primarily to FIGS. 26 to 30. Cable releasing operations of the shift operating unit 30 are performed by the rider pivotally moving the shift operating lever 32 about the shift pivot axis P3 in the lateral inward direction towards the bicycle longitudinal center plane. The shift operating lever 32 is operated in a single progressive movement such that in the connecting member 56 moves in a single progressive movement in the first rotational direction R1 from the current shift position to the next adjacent shift position.

Figure 26:
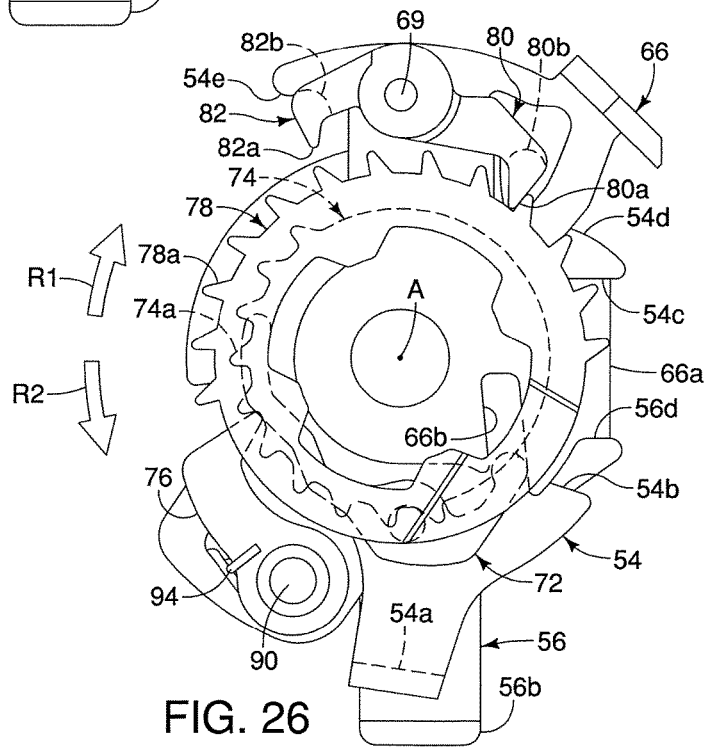
FIG. 26 is a rear elevational view of the selected parts of the shift operating unit shown in FIGS. 23 and 24 with the parts in their rest positions, but in a different shift position from the shift position shown in FIG. 23.
Figure 27:
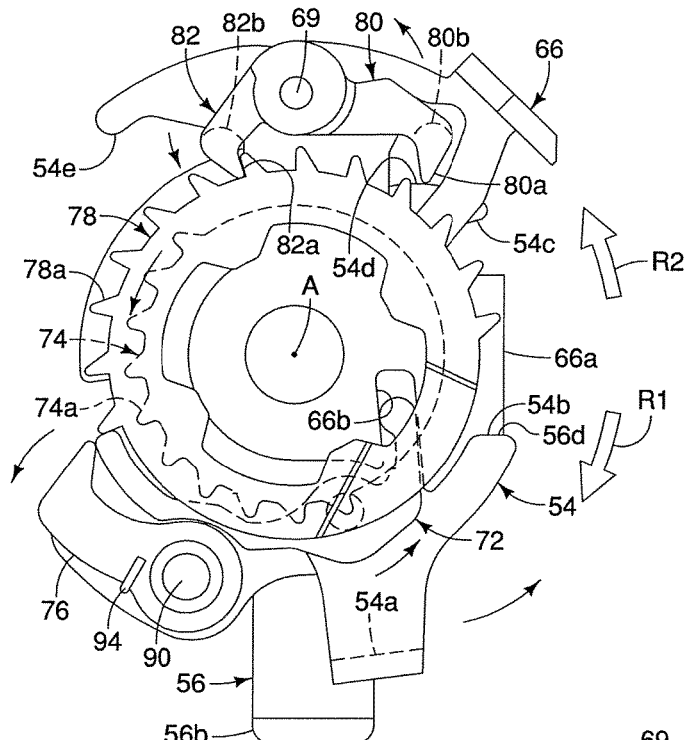
FIG. 27 is a rear elevational view of the selected parts of the shift operating unit shown in FIGS. 23 to 26 with the release member moved to a cable releasing position from the rest position shown in FIG. 26 such that the positioning pawl disengages the positioning ratchet and the stopping pawl engages the positioning ratchet to release the inner wire connected to the rear derailleur by one shift position.
Figure 28:
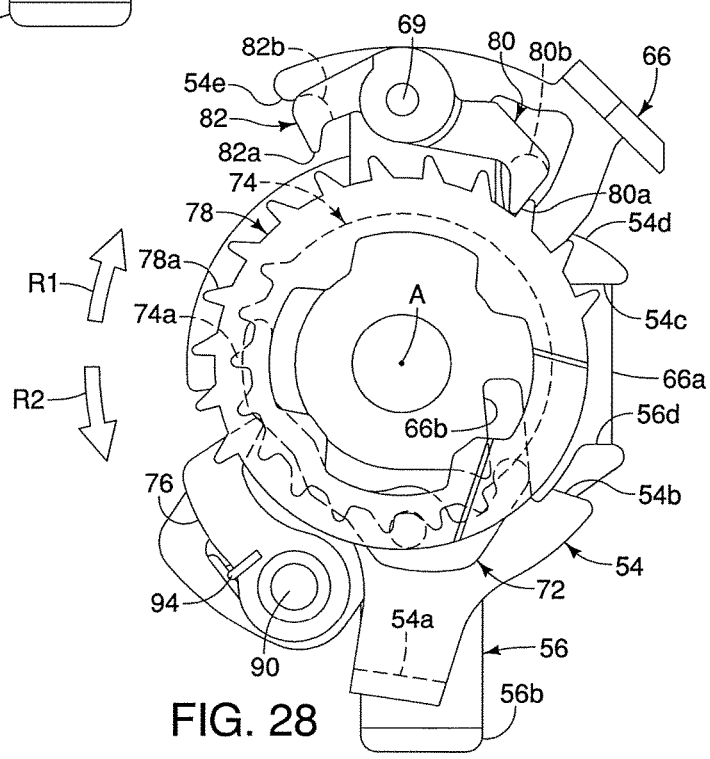
FIG. 28 is a rear elevational view of the selected parts of the shift operating unit shown in FIGS. 23 to 27 with the parts in their rest positions after the cable releasing operation of FIG. 27.
Figure 29:
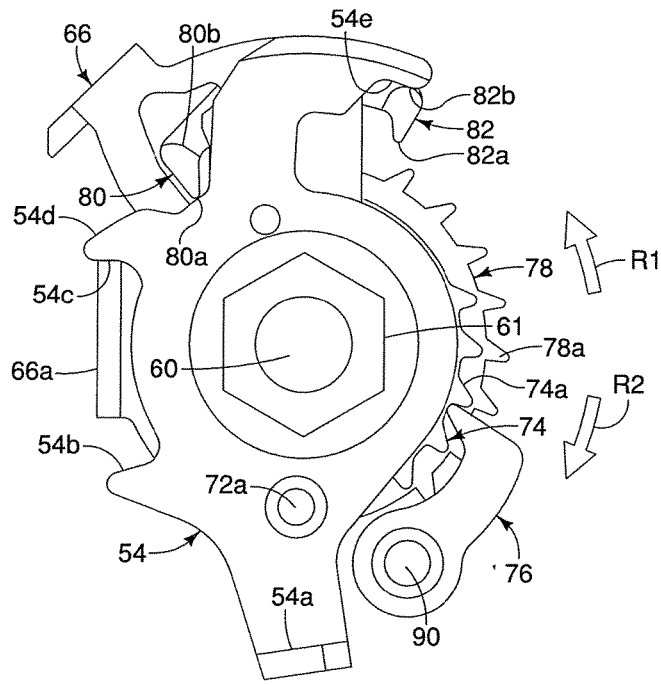
FIG. 29 is a front elevational view of selected parts of the shift operating unit shown in FIGS. 23 to 28 with the connecting member removed to show the engagements between the release member and the stopping pawl and the positioning pawl in the rest positions.
Figure 30:
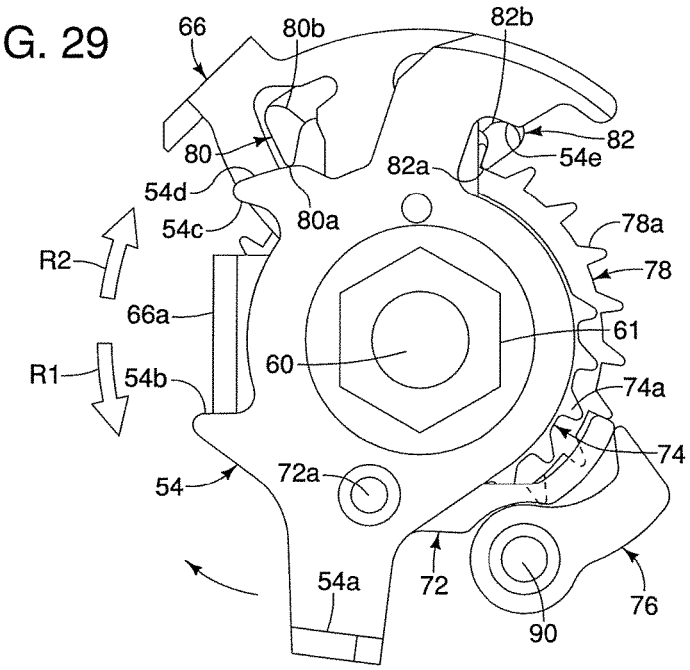
FIG. 30 is a front elevational view of selected parts of the shift operating unit shown in FIGS. 23 to 29 with the connecting member removed to show the engagements between the release member and the stopping pawl and the positioning pawl after the release member has been moved to disengage the positioning pawl from the positioning ratchet.

FIGS. 26, 28 and 29 show rest positions of the release member 54, while FIGS. 28 and 30 show shifting positions of the release member 54. As seen in FIGS. 27 and 30, the pivotal movement of the release member 54 by the operation of shift operating lever 32 pushing the contact flange 54a of the release member 54 causes the cam surface 54d to pivot the positioning pawl 80 out of engagement with the positioning ratchet teeth 78a of the positioning ratchet 78 and the cam surface 54e to pivot the stopping pawl 82 into engagement with the positioning ratchet teeth 78a of the positioning ratchet 78. As a result, the take-up member 58, the pulling ratchet 74 and the positioning ratchet 78 rotate in the second rotational direction R2 under the force of the biasing element 62. However, since the stopping pawl 82 engages one of the positioning teeth 78a of the positioning ratchet 78 to stop the rotation of the take-up member 58, the pulling ratchet 74 and the positioning ratchet 78 such that the take-up member 58 is held in an intermediate shift position. Then upon releasing the release member 54 as seen in FIG. 28, the positioning pawl 80 moves back into the path of the positioning teeth 78a, and the stopping pawl 82 moves out of the path of the positioning teeth 78a. In this way, the take-up member 58 rotates for only one shift position on the shift axle 60 in the second rotational direction R2. Now, another cable releasing operation of the shift operating unit 30 can be performed by the rider pivotally moving the shift operating lever 32 about the shift pivot axis P3 in the lateral inward direction towards the bicycle longitudinal center plane.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below", "inner", "outer" and "transverse" as well as any other similar directional terms refer to those directions of a bicycle equipped with the bicycle shift operating device on a flat horizontal surface. Accordingly, these terms, as utilized to describe the bicycle shift operating device should be interpreted relative to a bicycle equipped with the bicycle shift operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift operating device comprising:
    a base member including a first end with a bicycle mounting structure, a second end spaced from the first end and a top surface extending between the first end and the second end;
    a shift unit disposed in the base member between the first end and the second end;
    a first operating lever pivotally mounted relative to the base member about a first pivot axis, and pivotally mounted relative to the base member about a second pivot axis; and
    a connecting member operatively connecting the shift unit to the first operating lever, the connecting member including a lever contact portion that contacts the first operating lever to transmit movement of the first operating lever to the connecting member in response to pivotal movement of the first operating lever about the second pivot axis, the connecting member being arranged such that the lever contact portion passes into a space provided between the first pivot axis and the first operating lever from a top surface side of the base member with respect to the first pivot axis,
    the lever contact portion partially extending toward the second end of the base member relative to the first pivot axis from a position that is between the top surface side and the first pivot axis and that is between the second end of the base member and the first pivot axis.

2. The bicycle shift operating device according to claim 1, wherein
    the lever contact portion of the connecting member remains in contact with the first operating lever while the first operating lever is pivoted about the first pivot axis from a rest position to an operated position.

3. The bicycle shift operating device according to claim 1, wherein the connecting member includes a mounting portion pivotally mounted relative to the base member, and the lever contact portion of the connecting member extends in a radially outward direction from the mounting portion.

4. The bicycle shift operating device according to claim 3, wherein
the first operating lever is pivotally mounted to the base member about the first pivot axis by a support member, and the support member at least partially straddles the mounting portion.

5. The bicycle shift operating device according to claim 1, wherein
the connecting member includes a pulling pawl arranged to selectively rotate a pulling ratchet of the shift unit, the pulling pawl being disposed between the first pivot axis and the bicycle mounting structure with respect to the longitudinal direction of the base member.

6. The bicycle shift operating device according to claim 1, wherein
the shift unit includes a shift axle and a take-up member pivotally mounted on the shift axle, and
the connecting member includes a tubular mounting portion pivotally mounted on the shift axle.

7. The bicycle shift operating device according to claim 6, wherein
the tubular mounting portion is disposed at the top surface side with respect to the first pivot axis.

8. The bicycle shift operating device according to claim 6, wherein
an orientation between the tubular mounting portion and the lever contact portion remains the same while the first operating lever is pivoted about the first pivot axis from a rest position to an operated position.

9. The bicycle shift operating device according to claim 1, wherein
the first operating lever is arranged such that the second pivot axis is axially aligned with a main shift axis of the shift unit.

10. The bicycle shift operating device according to claim 1, wherein
the first operating lever is arranged such that the first pivot axis and the second pivot axis are transversely arranged with respect to each other.

11. The bicycle shift operating device according to claim 1, further comprising
a second operating lever pivotally mounted relative to the first operating lever such that pivotal movement of the second operating lever operates the shift unit.

12. The bicycle shift operating device according to claim 11, wherein
the shift unit includes a positioning mechanism and a take-up member, the positioning mechanism being arranged to selectively maintain the take-up member in a plurality of positions, and
the first operating lever and the second operating lever are operatively coupled to the positioning mechanism such that the take-up member moves in a first rotational direction in response to pivotal movement of the first operating lever and such that the take-up member moves in a second rotational direction in response to pivotal movement of the second operating lever with respect to a pivot axis of the take-up member, the first rotational direction being opposite of the second rotational direction.

13. The bicycle shift operating device according to claim 11, wherein
the second operating lever is pivotally mounted relative to the base member about a third pivot axis to operate the shift unit, with the third pivot axis being offset from the second pivot axis.

14. The bicycle shift operating device according to claim 1, wherein
an entirety of the lever contact portion is disposed in the space provided between the first pivot axis and the first operating lever along a direction parallel to the longitudinal direction of the base member.

15. The bicycle shift operating device according to claim 1, wherein
the connecting member includes a first abutment and a second abutment arranged to limit rotation of the connecting member in a first rotational direction and a second rotational direction, respectively, with the first abutment setting a rest position of the connecting member.

* * * * *